United States Patent [19]

Kuramori et al.

[11] Patent Number: 5,626,902

[45] Date of Patent: May 6, 1997

[54] FATS HAVING FUNCTION FOR PREVENTING SWELLING CAUSED BY OIL ABSORPTION AND CONFECTIONERY USING THE SAME

[75] Inventors: Kouichi Kuramori, Kitasoma-gun; Nobuo Sagi, Tsukuba-gun; Hiroyuki Mori, Abiko, all of Japan

[73] Assignee: Fuji Oil Company, Limited, Osaka-fu, Japan

[21] Appl. No.: 415,043

[22] Filed: Mar. 31, 1995

[30] Foreign Application Priority Data

Mar. 31, 1994 [JP] Japan ................................ 6-064192

[51] Int. Cl.$^6$ .................................................. A23G 1/00
[52] U.S. Cl. ........................... 426/607; 426/99; 426/610
[58] Field of Search .................................... 426/607, 610

[56] References Cited

U.S. PATENT DOCUMENTS

| | | | |
|---|---|---|---|
| 4,016,302 | 4/1977 | Katenberg | 426/607 |
| 4,219,584 | 8/1980 | Mori | 426/607 |
| 4,268,527 | 5/1981 | Matsuo | 426/607 |
| 4,276,322 | 6/1981 | Padley | 426/607 |
| 4,282,265 | 8/1981 | Theuer | 426/607 |
| 4,283,436 | 8/1981 | Soeters | 426/607 |
| 4,348,423 | 9/1982 | Paurand | 426/607 |
| 4,447,462 | 5/1984 | Tafuri | 426/607 |
| 4,702,928 | 10/1987 | Wieske | 426/607 |
| 4,705,692 | 11/1987 | Tanaka | 426/607 |
| 4,726,959 | 2/1988 | Momura | 426/610 |
| 4,839,192 | 6/1989 | Sagi | 426/607 |
| 4,855,152 | 8/1989 | Nakano | 426/610 |
| 4,873,109 | 10/1989 | Tanaka | 426/607 |
| 4,877,636 | 10/1989 | Koyano | 426/607 |
| 4,910,037 | 3/1990 | Sagi | 426/607 |
| 5,023,101 | 6/1991 | Sugihara | 426/607 |
| 5,135,769 | 8/1992 | Itagaki | 426/607 |
| 5,271,950 | 12/1993 | Yamaguchi | 426/607 |
| 5,279,846 | 1/1994 | Okumura | 426/607 |
| 5,286,515 | 2/1994 | Yamaguchi | 426/607 |
| 5,405,639 | 4/1995 | Pierce | 426/607 |
| 5,424,090 | 6/1995 | Okawauchi | 426/607 |

*Primary Examiner*—Carolyn Paden
*Attorney, Agent, or Firm*—Wenderoth, Lind & Ponack

[57] ABSTRACT

Migration of fat in complex confectionery is prevented by using a fat having a function for preventing swelling caused by oil absorption which comprises 1,3-saturated-2-unsaturated type glycerides of which at least one constituent saturated fatty acid has 20 to 24 carbon atoms. Chocolate having a function for preventing swelling caused by oil absorption to be used for a complex confectionery which comprises a fat ingredient comprising 1,3-saturated-2-unsaturated type glycerides of which constituent saturated fatty acids have 20 to 24 carbon atoms is also disclosed. Further, a complex confectionery comprising the chocolate and a baked confectionery and shell molded type chocolate are also disclosed.

3 Claims, 2 Drawing Sheets

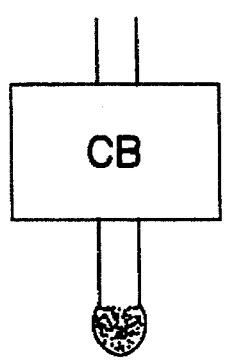 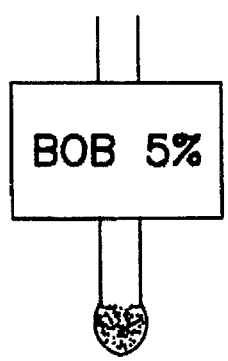 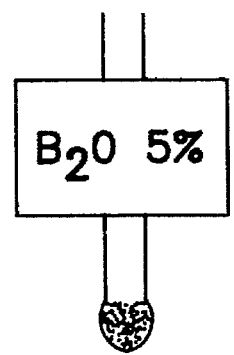
FIG. 1A   FIG. 1B   FIG. 1C
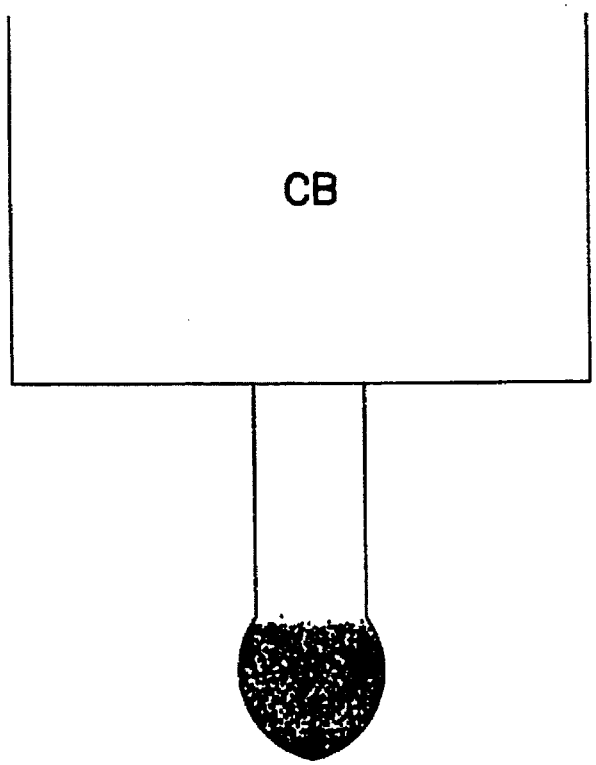
FIG. 2

FATS HAVING FUNCTION FOR PREVENTING SWELLING CAUSED BY OIL ABSORPTION AND CONFECTIONERY USING THE SAME

FIELD OF THE INVENTION

The present invention relates to fats having a function for preventing swelling caused by oil absorption and confectionery using the fats.

BACKGROUND OF THE INVENTION

There are complex confectionery products such as baked confectionery made from wheat flour, fat ingredients, sugar and the like as main raw materials, for example, biscuits and cookies, coated with chocolate or containing chocolate sandwiched therein. In such complex confectionery products, liquid fat ingredients in baked confectionery such as margarine, shortening and the like tend to migrate to chocolate, which causes whitening of baked confectionery (origin of migration) and softening of chocolate (destination of migration). This phenomenon remarkably deteriorates the commercial value of complex baked confectionery products.

In addition, in shell molded type chocolate and the like, liquid fat ingredients tend to migrate from center portions to shell portions, which causes softening and sticking of the shell portions (destination of migration), dryness and crumbling of center portions (origin of migration) and inferior melt in the mouth. This phenomenon also remarkably deteriorates commercial value of products.

These phenomena are referred to as so-called "migration phenomena of fats and oils" as disclosed in "Confectionery Production", G. Talbot, et al., p 265, April (1990), JP-B 61-47491, JP-A 63-126457, JP-A 64-60325, JP-A 5-192081 and the like. In these prior art publication, an additive is added to a fat phase in an origin of migration (for example, margarine or shortening in the case of baked confectionery or center cream in the case of shell mold chocolate) to finely crystallize the fat phase to control solid-liquid separation, thereby lowering the degree of freedom of a liquid fat ingredient to prevent migration of the liquid fat ingredient. Or, the formulation of confectionery products is designed on the assumption that the migration of liquid fat ingredients would take place. However, these prior art techniques are far apart from measures which are taken by intensively studying the functional mechanism of migration phenomena and directly treating the cause thereof.

OBJECTS OF THE INVENTION

The present inventors have studied the functional mechanism of migration of liquid fat ingredients of complex confectionery products, intensively. As a result, it has been found that migration is a phenomenon that the liquid fat ingredient in the fat phase of a baked confectionery in a complex confectionery product permeates into fine holes present in the fat ingredient of chocolate in contact with the fat phase and that the amount of permeation is influenced by the diameter of the holes at a specific region in a destination of migration (JP-A 5-292886). In addition, it has also been found that, when migration of a liquid fat ingredient has taken place, the fat ingredient in a destination of migration becomes swollen by oil absorption.

Thus, the present inventors have aimed at a means for preventing migration of a liquid fat ingredient of a complex confectionery product which is different from a conventional means for controlling the fat phase of an origin of migration, but rather controls the fat ingredient in respect to the destination of migration. For this purpose, the present inventors have investigated fats by considering the presence or absence of a function for preventing swelling caused by oil absorption as an indication of the ability to prevent migration of a liquid fat ingredient. Thus, the present invention has been completed.

That is, one object of the present invention is to provide a fat which can prevent migration of a liquid fat ingredient in the baked confectionery of a complex confectionery product to chocolate.

Another object of the present invention is to provide a complex confectionery product comprising the fat of the present invention in which the migration of the liquid fat ingredient of the baked confectionery to chocolate is minimized.

These objects as well as other objects and advantages of the present invention will become apparent to those skilled in the art from the following description together with the accompanying drawings.

BRIEF DESCRIPTION OF DRAWINGS

FIGS. 1A, 1B and 1C are a front views illustrating the results of a test for swelling caused by oil absorption of 3 samples of Example 2 hereinafter.

FIG. 2 is an enlarged front view illustrating the result of the control sample (CB) in FIG. 1.

SUMMARY OF THE INVENTION

Figure 3:
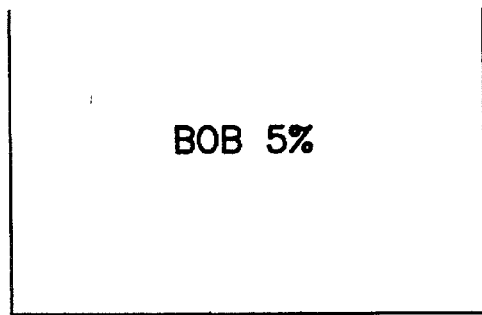
FIG. 3 is an enlarged front view illustrating the result of the 1,3-dibehenoyl-2-oleyl glyceride (BOB) fat-adding sample in FIG. 1.

According to the present invention, there is provided a fat having a function of preventing the swelling caused by oil absorption which comprises 1,3-saturated-2-unsaturated type glycerides of which at least one constituent saturated fatty acid has 20 to 24 carbon atoms.

The present invention also provides chocolate having the function of preventing swelling caused by oil absorption to be used for a complex confectionery which comprises a fat ingredient comprising 1,3-saturated-2-unsaturated type glycerides of which at least one constituent saturated fatty acid has 20 to 24 carbon atoms.

The present invention further provides a complex confectionery comprising the chocolate of the present invention and a baked confectionery as well as a shell molded type chocolate comprising the shell of the chocolate of the present invention and a center cream.

DETAILED DESCRIPTION OF THE INVENTION

As the first aspect, the present invention provides a fat having a the function of preventing the swelling caused by oil absorption which comprises 1,3-saturated-2-unsaturated type glycerides of which at least one constituent saturated fatty acid has 20 to 24 carbon atoms.

Di-saturated-mono-unsaturated type triglycerides including the above 1,3-saturated-2-unsaturated type glycerides of which at least one constituent saturated fatty acid has 20 to 24 carbon atoms and their production have been known by U.S. Pat. No. 4,241,054, JP-A 62-6635, JP-A 63-240745 and the like and the triglycerides can be produced according to any of these known methods such as interesterification. However, there is no teaching or suggestion of a fat having the function of preventing the swelling caused by oil absorption in these prior art publications.

That is, U.S. Pat. No. 4,241,054 discloses the triglycerides as a cacao butter substitute of a pharmaceutical composition for preventing archorrhea. JP-A 62-6635 discloses the triglycerides as an anti-fat blooming agent. JP-A 63-240745 discloses the triglycerides as an agent for omitting or facilitating a tempering operation or as an agent for restoring gloss of chocolate after storing at such a high temperature that chocolate loses its shape retention. None of these prior art disclose a fat having a function of preventing the swelling caused by oil absorption.

The term "fat having a function for preventing swelling caused by oil absorption" used herein represents a fat which is different from a conventional fat to be used in a fat phase of an origin of migration (for example, JP-A 63-126457 as described above) but is a fat which is used in a fat phase of a destination of migration. The fat has a function such that it comes into contact with a fat phase of a low solid fat portion (a portion containing a larger amount of a liquid fat, i.e., origin of migration) to prevent migration of a fat from the low solid fat portion and to prevent swelling of a fat in the destination of migration caused by oil absorption. This function does not have any relation to anti-fat blooming or omission or facilitation of a tempering operation.

In fact, as shown in Examples hereinafter, even di-saturated-mono-unsaturated type triglycerides which contain the constituent saturated fatty acids having 20 to 24 carbon atoms do not show any function for preventing swelling caused by oil absorption, if the unsaturated fatty acids residue is connected to 1- or 3-position of the triglycerides, although such triglycerides can prevent fat blooming in the chocolate production. Rather, such components interfere with the function of the co-existing corresponding 2-unsaturated type triglycerides.

In this respect, among di-saturated-mono-unsaturated type triglycerides containing the constituent saturated fatty acid having 20 to 24 carbon atoms, the corresponding 2-unsaturated type glycerides should be present in a larger amount than the corresponding 2-saturated type glycerides. Therefore, when enzymatic interesterification with an enzyme having 1,3-specificity is carried out to produce triglycerides, a product having the desired function can be obtained. However, when interesterification is carried out by using an alkali metal catalyst such as sodium methylate to produce triglycerides, it is difficult to obtain a product having the desired function because the yield of 2-saturated type glycerides are twice the yield of corresponding 2-unsaturated type glycerides.

In addition, even if triglycerides are 1,3-saturate-2-unsaturated type triglycerides, in the case that they are those predominantly used in cacao butter substituents, i.e, the constituent saturated fatty acids being those of relatively short chains such as that having 16 to 18 carbon atoms, the triglycerides do not shown the desired function.

Furthermore, when di-saturated-mono-unsaturated type triglycerides including that containing the constituent saturated fatty acids having 20 to 24 carbon atoms are used in the form of stable crystalline powder without melting in the chocolate production, they show function by making it possible to omit or facilitate the tempering operation. However, the function of preventing the swelling caused by oil absorption is scarcely expected by such method for using the triglycerides.

Thus, in the present invention, it is desired that the triglycerides, of which at least one constituent saturated fatty acid has 20 to 24 carbon atoms, are used in the form of a melted state together with other triglycerides.

In the 1,3-saturated-2-unsaturated type triglycerides of which at least one constituent saturated fatty acid has 20 to 24 carbon atoms to be used as an effective ingredient for showing a function for preventing swelling caused by oil absorption, it is preferred that both saturated fatty acid residues are those of constituent fatty acids having 20 to 24 carbon atoms rather than only one residue being that of constituent fatty acid having 20 to 24 carbon atoms. As the unsaturated fatty acids, oleic acid is preferred rather linoleic acid and linolenic acid. In view of the availability of raw materials, among the saturated fatty acids having 20 to 24 carbon atoms, that having 22 carbon atoms, i.e., behenic acid is preferred.

That is, the typical example of the 1,3-saturated-2-unsaturated type glycerides in the present invention is 1,3-dibehenoyl-2-oleyl glyceride (hereinafter sometimes referred to as BOB). However, a part of them may be BOSt (St represents stearic acid residue), AOA (A represents arachic acid residue) or BLB (L represents linoleic or linolenic acid residue).

To prevent swelling caused by oil absorption, the effective amount of the glycerides in the fat of the present invention is preferably 0.1 to 20% by weight, more preferably 2 to 7% by weight based on the total weight of the fat. When the amount of the glycerides is too much, upon using the fat in the chocolate production, the viscosity is increased resulting in inferior workability. However, when other fats such as cacao butter and other hard butter are added to the fat before it is used for the production of chocolate to be used for complex confectionery, the fat can contain a larger amount of sodium hydroxide, potassium hydroxide and calcium hydroxide.

The fat of the present invention can be in the form of hard butter as a raw material for the production of chocolate. In such a case, the fat can be a composition mainly composed of 1,3-saturated-2-unsaturated type glycerides of which constituent saturated fatty acids have 16 to 18 carbon atoms and which contains 1,3-saturated-2-unsaturated type glycerides of which at least one constituent fatty acid has 20 to 24 carbon atoms in an amount of 2 to 20% by weight, preferably, 3 to 10% by weight based on the total weight of the composition.

The second aspect of the present invention is to provide chocolate having the function of preventing swelling caused by oil absorption to be used for a complex confectionery which comprises a fat ingredient containing the above 1,3-saturated-2-unsaturated type glycerides of which at least one constituent saturated fatty acid has 20 to 24 carbon atoms.

In this chocolate, as described hereinabove, the glycerides are contained in an amount of, preferably, 0.1 to 20% by weight, more preferably, 2 to 7% by weight based on the weight of the fat ingredient of the chocolate.

The chocolate can be produced according to a conventional process. Since the crystal transition rate of 1,3-saturated-2-unsaturated type glycerides, of which at least one constituent fatty acid has 20 to 24 carbon atoms, is slower than that of a conventional chocolate fat ingredient, any known seed agent (JP-A 62-136530, JP-A 64-60330, JP-A 2-406) can be used in the chocolate production.

The third and fourth aspects of the present invention are desired to provide a complex confectionery comprising the above chocolate of the present invention in combination with a baked confectionery and a shell molded type chocolate comprising the above chocolate of the present invention as its shell and center cream.

The baked confectionery and center cream are not limited to specific ones and any conventional baked confectionery and center cream can be used. For example, the baked confectionery can be biscuits made from, as main ingredients, wheat flour, fat ingredients and sugar and it can be embedded in the chocolate or completely or partly coated with the chocolate. Or, chocolate is sandwiched into the baked confectionery or vice versa.

The complex confectionery and shell molded type chocolate of the present invention can be produced according to a conventional process.

The following Examples further illustrate the present invention in detail but are not to be construed to limit the scope thereof. In the Examples, all percents and parts are by weight.

EXAMPLE 1

Production of BOB and dibehenoyl-monooleyl random glyceride (hereinafter referred to as $B_2O$)

High oleic sunflower oil and behenic acid ethyl ester were interesterified with a lipase having 1,3-specificity and ethyl ester was distilled off. The interesterified product was subjected to solvent fractionation and the resultant high melting point fraction was purified to obtain a fat containing 68% of glycerides having constituent fatty acids of 20 to 24 carbon atoms at 1,3-positions (hereinafter referred to as BOB fat).

$B_2O$ fat used in the following Examples as a comparative sample was produced by interesterifying high oleic sunflower oil and behenic acid ethyl ester with sodium methylate, distilling off ethyl ester, subjecting the interesterified product to solvent fractionation and purifying the middle melting point fraction to obtain a fat containing 68% of mixed acid glycerides having randomly distributed 2 molecules of constituent fatty acids of 20 to 24 carbon atoms and 1 molecular of oleic acid.

EXAMPLE 2

Production of fat having function for preventing swelling caused by oil absorption The desired fat was produced by adding BOB fat to cacao butter in an amount of 5% based on the total weight of the fat.

Each sample of this fat, cacao butter (CB, control) and a comparative fat produced by adding $B_2O$ fat to cacao butter in an amount of 5% based on the total weight of the fat was subjected to tempering and tested for swelling cause by oil absorption. In order to avoid any possible difference in tempering, a shortening type seed agent containing stable crystal powder of SOS glycerides was added to each fat in an amount of 0.2%.

The test for swelling caused by oil absorption was carried out as follows:

The fat sample subjected to tempering at 30° C. was poured into a glass tube having 5 mm inner diameter from one end thereof until the front of the fat reached at 6 cm distance from the end. The glass tube was allowed to stand at 15° C. for 20 minutes to cool and solidify the fat sample and aged at 20° C. for 1 week. Then, the fat sample was pushed from the glass tube to obtain a sample in the form of a rod. The rod sample was suspended and fixed on a beaker containing a colored liquid fat (0.5% Sudan IV dissolved in high oleic sunflower oil containing 80% of oleic acid) so that the lower end of the rod sample came contact with the colored liquid fat. The sample was allowed to stand in this position for one week with changing temperature (1 temperature change cycle/day, at 18° C. for half a day and 27° C. for half a day). After one week, absorption of the colored liquid fat and swelling of the rod sample was observed by the naked eye.

Figure 4:
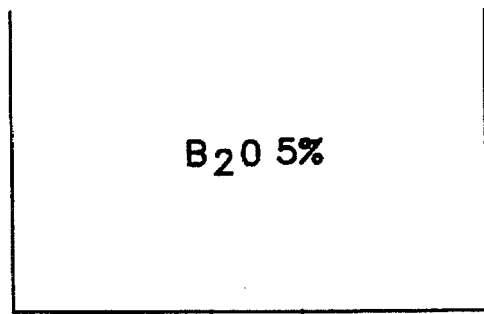
FIG. 4 is an enlarged front view illustrating the result of the dibehenoyl-monooleyl random glyceride ($B_2O$) fat-adding sample in FIG. 1.

The results are shown in FIGS. 1 to 4. In FIGS. 1 to 4, the portion in black represents absorption of the colored liquid fat. As seen from FIGS. 1 to 4, in comparison with cacao butter (CB) and $B_2O$ fat, the fat of the present invention (BOB fat) remarkably minimizes swelling of the fat.

EXAMPLE 3

Production of chocolate and shell molded type chocolate

| Ingredients | Parts |
| --- | --- |
| Shell chocolate | |
| Cacao butter | 26 |
| BOB fat | 2 |
| Cacao mass | 14 |
| Whole milk powder | 20 |
| Powdered sugar | 38 |
| Lecithin | 0.4 |
| Center cream | |
| Palm mid fraction | 32 |
| Whole milk powder | 32 |
| Powdered sugar | 36 |
| Lecithin | 0.4 |

According to the above formulations, shell molded type chocolate (shell:center=5:5) was produced by a conventional manner (referred to as A) and tested for liquid fat migration during storage for 1 week with changing temperature as described in Example 2 (17° C. and 28° C. 1 cycle/day).

The evaluation was carried out by extracting fats from the shell portion and the center cream portion before and after storage to determine decrease or increase in the fat content thereof.

As a control, another shell molded type chocolate produced according to the same manner except cacao butter was used instead of BOB fat (referred to as B) was subjected to the same test. The results are as follows.

| | Extracted fat % | |
| --- | --- | --- |
| | Shell portion | Center portion |
| Before storage | 37.54 | 36.68 |
| After storage | | |
| A (BOB fat) | 38.30 | 34.01 |
| B (Cacao butter) | 44.17 | 30.70 |

As seen from these results, when the fat containing BOB fat is used, increase in the fat content of the shell portion is inhibited and therefore softening and sinking which are specific phenomena for fat migration are prevented. In addition, decrease in the fat content of the center portion is not caused and thereby dryness and crumbling are prevented. Thus, when BOB fat is used, the desired initial state of the produce can be maintained.

EXAMPLE 4

Production of chocolate and shell molded type chocolate

| Ingredients | Parts |
| --- | --- |
| Shell chocolate | |
| Cacao butter | 26 |
| BOB fat | 2 |
| Cacao mass | 14 |
| Whole milk powder | 20 |
| Powdered sugar | 38 |
| Lecithin | 0.4 |
| Center cream | |
| Palm mid fraction | 32 |
| Whole milk powder | 32 |
| Powdered sugar | 36 |
| Lecithin | 0.4 |

According to the above formulations, shell molded type chocolate (shell:center =5:5) was produced by a conventional manner (referred to as A) and tested for liquid fat migration during storage for 1 week with changing temperature as described in Example 2 (17° C. and 28° C. 1 cycle/day).

The evaluation was carried out by extracting fats from the shell portion and the center cream portion before and after storage to determine decrease or increase in the fat content thereof.

For comparison, another shell molded type chocolate produced according to the same manner except cacao butter was used instead of BOB fat (referred to as B) or $B_2O$ fat was used instead of BOB fat (referred to as C) was subjected to the same test. The results are as follows.

| | Extracted fat % | |
| --- | --- | --- |
| | Shell portion | Center portion |
| Before storage | 37.54 | 36.68 |
| After storage | | |
| A (BOB fat) | 38.30 | 34.01 |
| B (Cacao butter) | 44.17 | 30.70 |
| C ($B_2O$ fat) | 43.55 | 29.80 |

As seen from these results, when the fat containing BOB fat is used, increase in the fat content of the shell portion is inhibited and therefore softening and sinking which are specific phenomena for fat migration are prevented. In addition, decrease in the fat content of the center portion is not caused and thereby dryness and crumbling are prevented.

On the other hand, the function of unsymmetric type fat of C is clearly different from the symmetric type fat of A and only BOB fat is effective to preventing migration of fat.

EXAMPLE 5

Production of chocolate and complex baked confectionery

| Ingredients | Parts |
| --- | --- |
| Chocolate | |
| Cacao butter | 26 |
| BOB fat | 2 |
| Cacao mass | 14 |
| Whole milk powder | 20 |
| Powdered sugar | 38 |
| Lecithin | 0.4 |
| Shaped in a disk having 40 mm diameter, 15 g. | |
| Biscuit | |
| Low gluten content wheat flour | 100 |
| Fat composition | 35 |
| White sugar | 40 |
| Whole egg | 5 |
| Salt | 0.5 |
| Water | 18 |

Shaped in a disk having 34 mm diameter, 4.0 g.

According to the above formulations, chocolate and biscuit were produced and then complex baked confectionery was produced by embedding biscuit in chocolate so that the surface of biscuit was exposed outside of the chocolate.

This complex baked confectionery was subjected to a storage test for 2 weeks with 2 cycles/day temperature change between 17° C. and 28° C.. As a control, another complex baked confectionery was produced according to the same manner except that cacao butter was used instead of BOB fat.

As a result, in the control, whitening or spot of the biscuit portion was observed at 15 cycles, whereas no such phenomenon was observed in the case of using BOB fat and good state was maintained.

EXAMPLE 6

Production of chocolate and complex baked confectionery

According to the same manner as described in Example 5, complex baked confectionery was produced except that the chocolate was produced by using BOB fat 1.5 part instead of BOB fat 2 part, adding stable crystal powder 0.5 part to chocolate mix at 35° C. during cooling after conching without melting and omitting tempering.

When the same storage test for 2 weeks with 2 cycles/day temperature change was carried out, in the control, whitening or spot of the biscuit portion was observed at 15 cycles, whereas no such phenomenon was observed in the confectionery of this Example and good state was maintained.

As described hereinabove, the fat of the present invention has a function for preventing swelling caused by oil absorption and migration of fat can be prevented by adding it to a fat phase of a destination of migration rather than a fat phase of an origin of migration. Then, undesire phenomena such as whitening, softening, dryness and crumbling in fat containing food products such as biscuits, cookies and shell molded type chocolates can be prevented and it is possible to maintain such food products in good state for a long period of time without any damage of appearance and deterioration melt in the mouth.

What is claimed is:

1. A method for preventing fat migration of a complex confectionery composed of chocolate and a baked confectionery which comprises adding a fat comprising 1,3-dibehenoyl-2-oleyl glycerides to the chocolate, wherein said glycerides are used in the form of a melted state together with other triglycerides.

2. A method for preventing fat migration of shell molded chocolate which comprises adding a fat comprising 1,3-dibehenoyl-2-oleyl glycerides to the shell, wherein said glycerides are used in the form of a melted state together with other triglycerides.

3. A method according to claim 2 in which the shell molded chocolate comprises a shell of chocolate and a center cream.

* * * * *